June 13, 1967 L. JEDYNAK 3,324,647
PROXIMITY DETECTOR
Filed Aug. 11, 1964
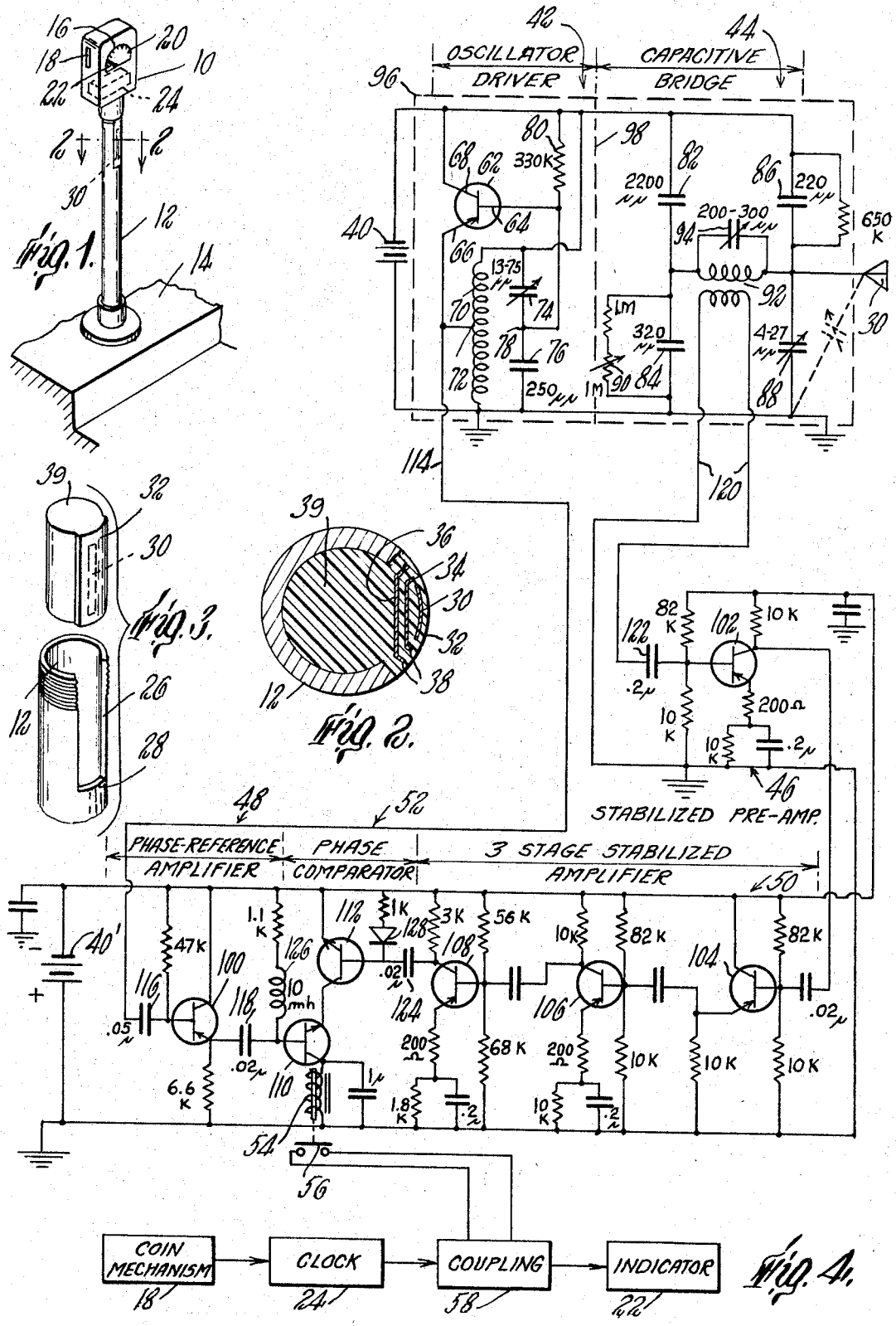

United States Patent Office 3,324,647
Patented June 13, 1967

3,324,647
PROXIMITY DETECTOR
Leo Jedynak, Madison, Wis., assignor to The Parmet Company, Newton Highlands, Mass., a partnership of Massachusetts
Filed Aug. 11, 1964, Ser. No. 388,856
13 Claims. (Cl. 58—142)

This invention relates to proximity detectors and more particularly to proximity detectors of a type particularly adapted for use in vehicle parking controls, for example, which sense the approach or withdrawal of a foreign object at the supervised location, which approach or withdrawal varies the capacitance of an electric circuit and that sensed variation operates an output device.

A variety of proximity detector circuits have been developed to detect the presence of a foreign object. One difficulty encountered with the variable capacitance type of proximity detector is due to the fact that the change in capacitance produced by the object to be sensed may be extremely small and, hence, the sensing circuitry adjustments are critical in nature. A related problem arises when the sensor is to be located in an area which is subject to significant environmental changes. For example, changes in the temperature and the moisture content of air affects transistor characteristics and the dielectric constant of the capacitive response, respectively. The response of the detector to the foreign object should be of the desired sensitivity, promptness and accuracy.

It has been frequently proposed to incorporate a proximity detector in parking meters to provide a reset of the timing mechanism when a vehicle is moved into or out of the parking area. Such a resetting mechanism would provide improved parking control as it prevents a second motorist from using the balance of the time on the meter after a parking space has been vacated without payment of any parking fee. Several different proximity detectors have been proposed for this purpose, but none, to my knowledge, have provided acceptable control. Such proximity detectors preferably should be compact, individual units capable of being mounted and arranged in the conventional type of parking meter post without major installation problems such as burying vehicle sensors in the street. They should be reliable in operation and require only minimal adjustment and other forms of maintenance so the cost of the parking meter installation will compare favorably with the revenue derived therefrom. The detectors should operate reliably over the range of anticipated environmental conditions and not be adversely influenced by persons in the vicinity of the meter. The entire meter installation incorporating the detector should be rugged and not susceptible to damage through vandalism, for example, and the meter should not provide false indications either of the presence or absence of vehicles.

Accordingly, it is an object of this invention to provide a novel and improved proximity detector of the capacitive type.

Another object of the invention is to provide a novel and improved proximity detector which operates reliably in response to a wide range of environmental conditions.

Another object of the invention is to provide a compact proximity detector unit which provides an output signal in response to sensed change in capacitance.

Still another object is to provide a novel and improved parking control device.

A further object of the invention is to provide a novel and improved parking meter which includes a resetting mechanism for resetting the time indicator of the meter in response to the withdrawal of the vehicle from the supervised parking area.

Still another object of the invention is to provide a novel and improved parking meter incorporating electronic circuitry for sensing electrically the presence or absence of a vehicle in the parking area and producing an output signal to operate the meter mechanism as a function thereof.

Still another object of the invention is to provide a parking meter incorporating novel and improved electronic apparatus which responds to changes in capacitance due to movement of a vehicle relative to the parking area supervised by the meter.

A further object of the invention is to provide a parking meter having a stable and reliable electronic vehicle sensing mechanism.

In accordance with the invention the proximity detector includes a signal source arranged to generate a principal signal and a subsidiary signal. The proximity detector further includes a sensor in the form of a capacitive type of antenna element which is coupled to the signal source in a manner to vary the magnitude and the phase of the subsidiary signal with respect to the principal signal as a function of the position of the object to be sensed relative to the sensor. Preferably one or more isolator plates are employed in the vicinity of the antenna, and in the preferred form of parking meter, these isolator plates are positioned between the metal post which supports the proximity detector circuitry and the antenna so that the sensitivity of the antenna with respect to vehicle movement is increased.

The preferred form of signal source includes an oscillator which has an inductive capacitive tank circuit. The capacitive element of the tank circuit is a four-element capacitance bridge which, with tank circuit inductance, controls the frequency of the oscillator. The oscillator output signal at that established frequency is the principal signal, and a bridge output provides the subsidiary signal. The antenna element is connected to one bridge junction (between two capacitive elements of the bridge), and an isolator plate is connected to another junction of the bridge. The principal and subsidiary signals are compared, and, in response to a change of predetermined magnitude and phase, the detector produces an output signal as an indication of the detection of the object or condition to be sensed.

In the parking meter embodiment, the magnitude of the capacitive change to be sensed is in the order of 0.1 micromicrofarad and the circuitry is sufficiently sensitive to detect a vehicle located a distance of four feet from the antenna element and to operate a reset mechanism in response to movement of a vehicle out of the parking space supervised by the meter. This detector operation is in response to a decrease in capacitance only. An increase in antenna capacitance, due to changes in environmental conditions such as the presence of a person immediately adjacent the antenna, while causing a change in the relation of the principal and subsidiary signals, does not operate the circuitry to produce output signals which operate the reset mechanism. The detector employs solid-state circuitry which may be housed in a compact package positioned within a conventional meter post so that the antenna element is substantially flush with the normal circumference of the meter post but no elements protrude from the post. This packaging of the antenna element and detector circuitry minimizes the possibility of damage to the detector circuitry and sensing mechanism from accident or vandalism. The isolator plate structure also significantly reduces the dependence of the antenna capacitance on the support post parameters.

Other objects, features and advantages of the invention will be seen as the following description of a preferred embodiment progresses, in conjunction with the drawing, in which:

FIG. 1 is a perspective view of a typical parking meter installation employing structure constructed in accordance with the invention;

FIG. 2 is a sectional view through the parking meter post taken along the line 2—2 of FIG. 1;

FIG. 3 is a perspective view of a detector unit package and a portion of the parking meter post in which that detector unit package is housed; and FIG. 4 is a schematic diagram of the proximity detector circuitry employed in the parking meter shown in FIG. 1.

With reference to the drawing, there is illustrated in FIG. 1 a more or less conventional type of parking meter installation. The parking meter head 10 is mounted on a suitable standard or post 12 set into the ground or sidewalk 14 adjacent to the curb of the parking space that is to be controlled by the parking meter. The parking meter head includes a timing indicator visible through aperture 16 in the head and a coin receiving aperture 18. The time indicating mechanism of the parking meter may comprise a scale 20 suitably marked in terms of time and a movable pointer 22 which is driven by a suitable clock mechanism diagrammatically indicated at 24. Mechanism 24 is actuated in response to insertion of a coin in apterure 18 to move pointer 22 across scale 20 to indicate the amount of elapsed or remaining time.

A slot is formed in the upper end of post 12, which slot has two parallel side walls 26 and a horizontal base wall 28. An antenna element 30, which may be an electrically conductive strip element one-half inch in width and ten inches in length, is housed in an assembly in which dielectric material 32 (an epoxy or polyester resin, for example) extends in a thin layer over the outer surface thereof and surrounds the antenna. To the rear of the antenna element are two isolator plates 34, 36, each of which is spaced from the antenna element 30 by the dielectric material. The isolator plates 34 and 36 are curved outwardly so that their end portions 38 are interposed between the sides of the antenna 30 and the side walls 26 of the slot in the post. Formed integrally with the antenna element and isolator plate assembly is a housing 39 for the solid-state circuitry, which housing may be either an encapsulation of epoxy resin, for example, or a cavity in which some or all of the circuit components are mounted. Suitable means are provided to solidly ground the electrical circuitry, for example, through the post 12. The layer of dielectric material over the antenna provides mechanical protection for that element while not significantly affecting the capacitive sensitivity of the detector with respect to the vehicle in the parking space, antenna 30 serving as one plate of the capacitor and the vehicle supervised by the meter functioning as the second plate of the capacitor. As the spacing between the two plates of the capacitor varies, the capacitance value thereof changes correspondingly, as is well known.

The housing 39 is slid down into the post with the antenna-isolator plate section disposed between side walls 26 of the slot and is supported, at least in part, by the base 28 of the slot. The base of the meter housing includes a threaded collar which engages the threaded end of post 12 and overlies the upper end of housing 39. This structural configuration enables the antenna to have substantial sensitivity without the disadvantages attendant upon any structural elements that protrude from the post.

The circuitry of the proximity detector housed in post 12 is shown in FIG. 4. That circuitry is powered by a nine-volt power supply (indicated as two batteries 40, 40′) and includes an oscillator having a driver section generally indicated at 42 and a capacitive bridge section 44; a pre-amplifier stage 46; amplifier sections 48 and 50; and a phase comparator section 52. A relay having a coil 54 connected in the phase comparator section operates contacts 56 which in turn control a coupling 58 connected between the clock mechanism 24 and the indicator mechanism 22 that is driven to indicate the amount of elapsed or remaining time as a function of the number of coins that have been deposited in the coin mechanism 18. Energization of relay coil 54 closes contacts 56 to release the clutch coupling 58 and permits the indicator mechanism to reset.

The oscillator section includes a transistor 62 having base, emitter, and collector electrodes 64, 66, and 68, respectively. Coil 70, having its center tap 72 connected between the emitter and base of transistor 62, provides a Hartley oscillator configuration. Feedback control capacitors 74 and 76, connected in series across coil 70, reduce harmonic distortion of the oscillator drive signal (the principal signal), and junction 78, between the two capacitors, is connected to base electrode 64. A biasing resistor 80 is connected between base and collector electrodes of the transistor, and the battery 40 is connected between collector electrode 68 and ground (one terminal of coil 70).

The coil 70 forms the inductive portion of the tank circuit which controls the oscillator frequency, and bridge 44 forms the capacitive portion of that tank circuit. That bridge has capacitors 82, 84, 86, and 88 in its four legs. Variable resistor 90 is connected across capacitor 84 for phase adjustment purposes. The antenna element 30 is connected to the junction between capacitors 86 and 88 and effectively provides a capacitive element in parallel with capacitor 88. Isolator plate 34 is connected to the junction between capacitors 82 and 84, while isolator plate 36 is connected to the junction between capacitors 82 and 86. The grounded metal of pole 12, connected between capacitors 84 and 88, acts as a third plate, and should the detector support be non-metallic, a comparable grounded third plate structure may be employed with advantage. Across one diagonal of the bridge is connected an output transformer 92 which has a step-down ten-to-one ratio. Variable capacitor 94, connected across the primary winding of transformer 92, is used to resonate the primary inductance of the transformer with the bridge capacitances at the operating frequency.

Oscillator coil 70 is directly connected across the other diagonal of the bridge. In this manner the capacitive bridge circuit forms an integral part of the oscillator so that all of the oscillatory energy of the tank circuit of the oscillator is available to the bridge circuit. The principal control of oscillator frequency is capacitor 84, and with the component values as indicated in FIG. 3, the frequency of oscillation is about 75 kc., although other frequencies may, of course, be employed where desired. Shielding indicated at 96 is employed to prevent inductive coupling of energy into the amplifier circuitry. A shield partition 98 is also employed between the oscillator coil 70 and the bridge circuit 44.

This signal generator provides a principal (main oscillator) signal and a subsidiary (bridge) signal in an arrangement that operates on a low power and with small power drain from the source. The bridge circuit portion which generates the subsidiary signal is an integral component of the tank circuit of the oscillator so that coupling for energy transfer of high efficiency is provided between the transistor (drive) section of the oscillator and the bridge circuit. In addition, the output impedance arrangement in the bridge circuit increases the output energy transfer at that point through the use of a resonant circuit arrangement. Thus, the energy in the resulting subsidiary signal due to the sensing of a capacitance change in the order of 0.1 micromicrofarads provides a reliable indication of that capacitance change.

The isolator plate structure controls the apparent location of the post capacitance in circuit and produces significant reduction in the circuit sensitivity to variations in post parameters. A first isolating capacitive element is connected in parallel with the output impedance 92, and second and third isolating capacitive elements are connected across the larger capacitors of the bridge circuit so that the effect of the post parameters is transferred from the small capacitance in the bridge to the larger capacitances. The resulting antenna arrangement provides a detector of high sensitivity without the use of protruding structures that might tend to subject the detector to accidental or malicious damage. The antenna and detector structure, in fact, may appear, or in reality, be an integral portion of a smooth post structure that supports the parking meter unit.

The phase reference amplifier and comparator circuitry includes five amplifier stages having transistors 100, 102, 104, 106, and 108 and a phase comparator circuit which includes transistors 110 and 112. The output of oscillator 42 is applied over line 114 and through a coupling capacitor 116 to the phase reference amplifier stage 48 that includes transistor 100, which amplifier stage produces an output signal for application to coupling capacitor 118 of the phase comparator circuitry.

The output of the bridge 44 is coupled from the stepdown transformer 92 over lines 120 to coupling capacitor 122 of stabilized pre-amplifier stage 46 and subsequent amplification by the three-stage stabilized amplifier 50 that includes transistors 104, 106, and 108, respectively. Each stage is stabilized with respect to bias point and with respect to AC gain through the use of series feedback. After amplification, the bridge output signal is applied to coupling capacitor 124 of the phase comparator circuitry.

Thus, the amplified bridge output and phase reference signals are fed simultaneously to the phase comparator 52. That phase comparator includes two transistors 110, 112 which are connected in series, the input circuit (base electrode) of transistor 110 being connected to respond to the amplified phase reference (principal) signal and the input circuit of transistor 112 being connected to respond to the amplified bridge output (subsidiary) signal. Fine phase adjustment is provided by inductance 126, which adjustment may further include capacitive components. Diode 128 provides a discharge path for coupling capacitor 124 to insure that the comparator transistors will not improperly conduct due in part to accumulated charge on that capacitor.

When the phase reference signal is in phase with the bridge output signal (corresponding to a decrease in the capacitance between antenna 30 and ground from a reference value), both transistors 110 and 112 will turn on simultaneously. The magnitude of the current flow through the series output circuits of the two transistors is proportional to the bridge output voltage, that is, a function of the capacitance influence of antenna 30 on the bridge, and thus the bridge output voltage controls the current flow through the two transistors and, in turn, the energization of relay coil 54 to close contacts 56.

With an increase in the capacitance of antenna 30, the oscillator (phase reference) signal and the bridge output signal become 180° out of phase, and one of the phase comparator transistors 110, 112 will always be cut off so that the detector relay coil 54 will not be energized regardless of the amplitude of the signal from the bridge circuit. This arrangement is advantageous in this particular application as it prevents actuation of the resetting mechanism (coupling 58) in response to a sharp increase in capacitance as might occur when a person approaches the meter post. The decrease in capacitance must be substantial, which decrease will not occur as long as a vehicle is in the supervised parking space.

While the energization of relay coil 54 may produce a variety of output functions, provide an alarm for example, in the illustrated parking meter embodiment that energization releases coupling 134 and permits the indicator 22 to return to zero position independent of the clock 24. Also, the energization of relay 130 may also open the battery circuit and thus prolong the life of that component, the battery circuit being reclosed upon deposit of a coin in the parking meter.

Suitable component values have been indicated in FIG. 4 for the construction of a proximity detector in accordance with the invention. These component values are only illustrative, and a variety of other components may, of course, be employed in circuitry constructed in accordance with the invention. The following table indicates the types of transistors which may be used in the circuitry, but, again, this tabulation is for illustrative purposes only.

| Transistor: | Type |
| --- | --- |
| 62 | 2N404A. |
| 100, 102, 104, 106, 108 | 2N652. |
| 110, 112 | 2N338. |

While a preferred embodiment of the invention has been shown and described, various modifications thereof will be obvious to those skilled in the art, and therefore, it is not intended that the invention be limited to the disclosed embodiment or to details thereof and departures may be made therefrom within the spirit and scope of the invention as defined in the claims.

What is claimed is:

1. Detector apparatus comprising an oscillator including
   a tank circuit having an inductive element and a capacitive element,
   said capacitive element including a four-legged bridge that has a capacitor connected in each leg,
   means connecting said inductive element across a first diagonal of said bridge,
   an antenna element connected to said bridge and adapted to cooperate with the object to be detected so that the capacitive value of one leg of said bridge varies as the relationship between said antenna element and the object to be detected varies,
   means to produce an output signal from said bridge across a second diagonal thereof,
   means to produce an oscillator output signal,
   and means to compare said bridge output signal and said oscillator output signal.

2. The apparatus as claimed in claim 1 wherein said signal comparison means includes means responsive to the phase of said bridge output signal and said oscillator output signal.

3. The apparatus as claimed in claim 2 wherein said comparator means includes two transistors connected in series and an output device connected in series with said two transistors so that said output device is actuated when both of said transistors are conducting.

4. The apparatus as claimed in claim 3 and further including phase adjustment means in the input circuit of one of said transistors.

5. The apparatus as claimed in claim 3 and further including capacitive coupling means connected in the input circuit of one of said transistors and asymmetrically conductive means for removing the charge from said capacitive coupling means upon reversal of the polarity of the applied signal to said capacitive coupling means.

6. The apparatus as claimed in claim 1 and further including a detector support structure means to dispose said antenna element substantially in alignment with the outer surface of said support structure, and an electrically conductive isolator plate between and spaced from said antenna element and said support structure.

7. The apparatus as claimed in claim 6 wherein said antenna element is connected to one junction point of said bridge and said isolator plate is connected to a second junction point of said bridge.

8. The apparatus as claimed in claim 7 and further including a second isolator plate disposed between said first isolator plate and ground and means connecting said second isolator plate to a third junction point of said bridge.

9. The apparatus as claimed in claim 1 and further including an output transformer connected across one diagonal of said bridge and the inductive element of said tank circuit is connected directly across the second diagonal of said bridge.

10. The apparatus as claimed in claim 9 and further including a capacitance element connected in parallel with the primary of said transformer to resonate the primary inductance of said transformer with the bridge capacitance at the operating frequency of said oscillator.

11. In parking meter apparatus comprising a clock mechanism,
an indicator mechanism, and,
means coupling said clock mechanism to said indicator mechanism to advance said indicator mechanism to indicate elapsed time,
vehicle detector apparatus comprising a vehicle sensing antenna element mounted adjacent said parking meter indicator and adapted to cooperate with a vehicle to form a variable capacitance element,
a capacitive bridge circuit including four legs, each having a capacitor element,
said antenna element being connected to said bridge circuit,
an oscillator circuit including an inductor connected across said bridge circuit so that said inductor and said bridge circuit form the oscillator tank circuit,
means providing an oscillator output signal,
means to provide a bridge circuit output signal that varies as a function of said variable capacitance element,
means to compare said bridge output signal and said oscillator output signal, and
means responsive to a predetermined comparison between said bridge output and oscillator output signals to actuate said coupling means to permit reset of said indicator as a function of vehicle movement relative to the parking space supervised by said meter apparatus.

12. The detector apparatus as claimed in claim 11 wherein said antenna element is an elongated electrically conductive member disposed generally vertically and substantially in the plane of the outer surface of the post supporting said indicator mechanism, and further including a protective layer of dielectric material over said elongated member.

13. A proximity detector comprising an antenna element,
a bridge circuit having a capacitive element in each of its four legs,
means connecting said antenna element to a first leg junction of said first bridge,
an output impedance connected between said first leg junction and the opposite leg junction of said bridge,
a first electrically conductive isolator plate physically and electrically spaced from said antenna element connected to said opposite leg junction of said bridge,
and a second electrically conductive isolator plate physically and electrically spaced from said antenna element and said first isolator plate connected to a third leg junction of said bridge.

References Cited
UNITED STATES PATENTS

| | | | |
|---|---|---|---|
| 2,652,251 | 9/1953 | Gumpertz et al. | 340—51 |
| 2,656,507 | 10/1953 | Fielden | 328—5 |
| 2,817,234 | 11/1957 | Campbell | 317—246 |
| 2,826,738 | 3/1958 | Lupfer et al. | 317—246 |
| 2,858,505 | 10/1958 | Shawhan | 328—5 |
| 2,943,306 | 6/1960 | Gray et al. | 340—258 |
| 3,093,750 | 6/1963 | Brauer | 307—88.5 |
| 3,103,655 | 9/1963 | Jones | 328—5 |
| 3,183,411 | 5/1965 | Palfi | 307—88.5 |
| 3,199,096 | 8/1965 | Bagno | 340—258 |

RICHARD B. WILKINSON, *Primary Examiner.*

GERALD F. BAKER, *Examiner.*